May 6, 1958     P. H. PENMAN     2,833,313

DOUBLE JACKETED FIRE HOSE

Filed March 12, 1957

INVENTOR
PETER H. PENMAN
BY
ATTORNEY 2,833,313
United States Patent Office
         Patented May 6, 1958

2,833,313

DOUBLE JACKETED FIRE HOSE

Peter H. Penman, Huntingdon Valley, Pa., assignor to H. K. Porter Company (Delaware), Pittsburgh, Pa., a corporation of Delaware Application March 12, 1957, Serial No. 645,583

2 Claims. (Cl. 138—55)

This invention relates to textile jacketed fire hose and the like and is particularly directed to hose of the type in general use by municipal and other fire fighting organizations requiring a hose meeting the exacting specifications of rating bureaus, insurance underwriters' inspection organizations and the like yet of long service life and resistant to wear particularly at those zones or areas normally receiving maximum abrasion while the hose is being extended for use, replaced in a vehicle after use, transported to or from the scene of a fire or merely stored in preparation therefor.

As is well known hose of this type is ordinarily manufactured in such manner as to lie substantially flat under rest conditions but expanding to cylindrical form under internal water pressure when in use for extinguishing a fire and is generally stowed in serpentine or coiled arrangement. It results that when being carried to or from a fire those portions of the hose which form what may be termed its edges, considering it in its relatively flat condition of rest, are exposed to contact with other objects such as the deck or bed of a fire truck or the paving of a highway to an excessive degree as compared with the intermediate portions, herein termed its flat faces.

The edges of the textile outer covering or jacket of so-called "double jacketed" hose thus often become worn or damaged to an extent which renders the hose unserviceable while the portions between them are still in good condition.

It is thus a principal object of my invention to provide a textile jacketed fire hose having relatively highly abrasion-resistant areas or zones at the edges of its outer jacket whereby the excessive abrasion to which these areas are subjected in normal use is ineffective to cause deterioration in serviceability in advance of the loss of that quality by their respectively intermediate zones.

A further object is to provide means particularly adapted for incorporation in the outer jacket of double jacketed fire hose adapted to afford maximum protection against wear to the inner tube of rubber or comparable material and the inner textile fabric jacket bonded thereto which are enclosed within the outer jacket.

Other objects, purposes and advantages of the invention will hereafter more fully appear or be indicated from the following description of a preferred embodiment of it illustrated in the accompanying drawing in which.

Figure 1:
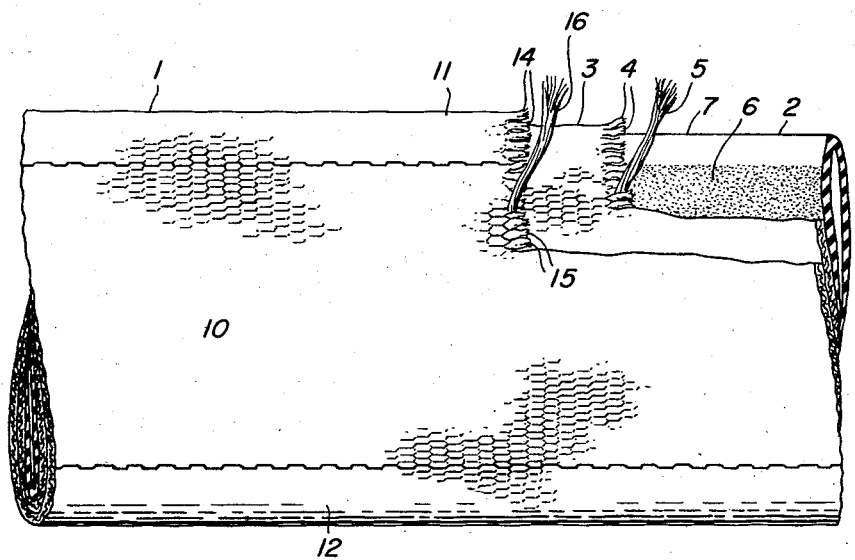
Fig. 1 is a fragmentary partially progressively broken away plan view of a piece of the hose in which relative thicknesses are somewhat exaggerated for clearness of illustration.
Figure 2:
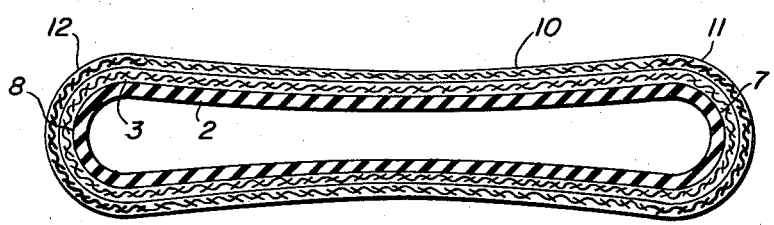
Fig. 2 is a transverse section of the hose at rest.

More particularly, the hose 1 in the drawing comprises an inner elastomeric tube 2 assuming at rest the form of a relatively elongated flat oval or ellipse in transverse section. Usually this inner, water impermeable tube is initially formed by extrusion of uncured elastomeric material through an annular orifice followed by partial curing under heat while the tube is uninflated and thus assuming a cross section substantially as illustrated in Fig. 2. Following partial curing it is drawn into a preformed woven jacket 3 preferably produced by a circular loom provided with relatively high twist multiple ply cotton warp yarns 4 with which a low twist single ply "Dacron" polyester or other suitable preferably synthetic fiber yarn 5 is interwoven as a continuous spiral filler. The inner tube 2 is coated with a suitable adhesive 6 on its flat faces, leaving its side edges 7, 8 uncoated before it is drawn into jacket 3 and after it has been properly aligned lengthwise therewith suitable temporary fittings (not shown) are applied to its ends and steam under pressure admitted to its interior and maintained therein for a time sufficient to effect complete cure of the elastomeric material of the tube and the adhesive applied to its flat faces. The steam pressure of course expands the tube to cylindrical form during this operation but does not inhibit retention of its tendency again to assume a relatively flat ovoid cross sectional form when internal pressure is relieved, the absence of adhesive from its edges permitting a certain amount of relative movement between the tube and jacket at these areas while intermediate ones are permanently bonded together by the heat-cured adhesive 6.

The product of the above operations is in all respects similar to single-jacketed fire hose such as has been in widespread use in the past, but as modern codes specify double-jacketed hose it does not fulfill their specifications. It has consequently been the practice to enclose the single-jacketed hose in an outer textile jacket formed in substantially the same manner as, but of slightly larger diameter than, jacket 3 before applying permanent end couplings to the hose, and it is this outer jacket which has been found unduly susceptible to wear at those regions which become the edges of the hose when it is deflated.

In accordance with the present invention, however, in making the outer jacket 10, using a circular loom similar to that above mentioned, I provide in each two diametrically spaced zones 11, 12 in place of the cotton warp yarns normally used therein about 24 ends of multiple ply high twist yarns 14 of Dacron polyester or other highly abrasive resistant synthetic fibers and weave them into the jacket in substantially the manner heretofore used for making outer jackets with cotton warp yarns only, these zones extending circumferentially of the jacket for about 1½″ for hose of 3″ nominal inside diameter. Cotton yarns 15 are used for the remaining warp ends and all are interwoven with Dacron filler yarn 16.

The single jacketed hose is then inserted in the outer jacket with the "edges" of the former respectively radially aligned with the zones 11, 12 comprising the Dacron warp yarns of the outer jacket, after which end couplings (not shown) are applied to the hose clamping the outer and inner jackets and inner lining together in a unitary hose section. Preferably the dimensions of the inner tube and jackets are proportioned to provide little or no opportunity for relative circumferential movement between the latter when the hose is in use, a certain amount of interlocking between the jackets being inherent in their construction and contributing to the permanence of their circumferential alignment, while the inner tube is of course bonded to the inner jacket and can move only locally relatively thereto.

As the fabric forming the outer jacket is so woven as to expose warp yarns only, keeping the filler yarn entirely covered by the latter, it is obvious the warp yarns only are subjected to appreciable abrasion in normal use and as those occupying the zones of greatest abrasive stress under such conditions are those most highly resistant thereto it is apparent hose life may be substantially prolonged as a result of practice of the invention.

It is of course impossible entirely to prevent abrasion of the outer jacket of a fire hose even if it be used only occasionally, and preserved with greatest care during intervals between successive periods of use, but the cotton warp sections of my outer jacket are rarely, if ever, subjected to destructive abrasion as long as the synthetic fiber warp zones remain intact.

While I have herein described one embodiment of my invention with considerable particularity it will be understood I do not desire or intend to limit or confine it specifically thereto or thereby as changes and modifications in the form, structure and arrangement of its components will readily occur to those skilled in the art and may be utilized if desired without departing from the spirit and scope of the invention as defined in the appended claims.

Having thus described my invention, I claim and desire to protect by Letters Patent of the United States:

1. A double jacketed fire hose comprising an inner water impermeable elastomeric tube, a woven textile fiber tubular inner jacket bonded to the tube outer surface at diametrically spaced longitudinal zones and an outer jacket ensheathing the inner jacket and comprising woven textile fabric having high abrasion resistance in longitudinal zones respectively registering with those portions of the inner jacket occupying the spaces between the said zones of the inner jacket which are bonded to the inner tube, and other zones of relatively low abrasion resistance substantially corresponding to that of the inner jacket respectively aligned with said zones of the latter, the outer jacket zones of high abrasion resistance comprising polyester textile fiber high twist multiple ply warp yarns and the zones of relatively low abrasion resistance comprising cotton high twist multiple ply warp yarns, all said yarns being interwoven with relatively low twist single ply polyester fiber filler yarn uninterruptedly traversing the zones and the boundaries between adjacent zones.

2. A double jacketed fire hose comprising an inner water impermeable elastomeric tube, a woven textile fiber tubular inner jacket bonded to the tube outer surface at diametrically spaced longitudinal zones and an outer jacket ensheathing the inner jacket and comprising woven textile fabric having high abrasion resistance in longitudinal zones respectively registering with those portions of the inner jacket occupying the spaces between the said zones of the inner jacket which are bonded to the inner tube, and other zones of relatively low abrasion resistance substantially corresponding to that of the inner jacket respectively aligned with said zones of the latter, the inner jacket comprising cotton high twist multiple ply warp yarns and polyester fiber low twist single ply filler yarn and the outer jacket comprising polyester fiber high twist multiple ply warp yarns substantially aligned with the warp yarns of the inner jacket which occupy spaces between said bonded zones of the inner jacket and cotton high twist multiple ply warp yarns substantially aligned with the warp yarns comprised in said zones of the inner jacket and polyester fiber low twist single ply filler yarn interwoven with all said outer jacket warp yarns.

References Cited in the file of this patent

UNITED STATES PATENTS

| | | |
|---|---|---|
| 1,100,829 | Joseph | June 23, 1914 |
| 1,256,520 | Coughlin | Feb. 19, 1918 |
| 2,598,022 | Smith | May 27, 1952 |

FOREIGN PATENTS

| | | |
|---|---|---|
| 133,874 | Australia | Aug. 15, 1949 |